United States Patent
Gross

(10) Patent No.: US 11,738,466 B1
(45) Date of Patent: Aug. 29, 2023

(54) ROBOT FOR PREPARING AND DELIVERING FOOD ITEMS

(71) Applicant: Idealab Studio, LLC, Pasadena, CA (US)

(72) Inventor: William Gross, Pasadena, CA (US)

(73) Assignee: Idealab Studio, LLC, Pasadena, CA (US)

( * ) Notice: Subject to any disclaimer, the term of this patent is extended or adjusted under 35 U.S.C. 154(b) by 328 days.

(21) Appl. No.: 16/889,421

(22) Filed: Jun. 1, 2020

Related U.S. Application Data

(60) Provisional application No. 62/856,649, filed on Jun. 3, 2019.

(51) Int. Cl.
| | |
|---|---|
| *B25J 5/00* | (2006.01) |
| *B60P 3/025* | (2006.01) |
| *B25J 11/00* | (2006.01) |
| *G08G 1/00* | (2006.01) |

(52) U.S. Cl.
CPC .............. *B25J 11/008* (2013.01); *B25J 5/00* (2013.01); *B60P 3/0257* (2013.01); *G08G 1/202* (2013.01)

(58) Field of Classification Search
CPC ........ B25J 9/1679; B25J 5/00; B25J 11/0045; B25J 11/008; B60P 3/0257; G06Q 10/083; G08G 1/202
See application file for complete search history.

(56) References Cited

U.S. PATENT DOCUMENTS

| | | | |
|---|---|---|---|
| 2017/0308851 A1* | 10/2017 | Beach-Drummond | ...................... G06Q 10/08355 |
| 2018/0321679 A1* | 11/2018 | Nixon | ..................... G08G 1/202 |
| 2019/0056751 A1* | 2/2019 | Ferguson | ............. G05D 1/0214 |
| 2021/0217111 A1* | 7/2021 | Goldberg | ............ G07F 17/0064 |

* cited by examiner

*Primary Examiner* — Spencer D Patton
(74) *Attorney, Agent, or Firm* — Knobbe, Martens, Olson & Bear LLP

(57) ABSTRACT

An automated food preparation and delivery robot is disclosed. The automated food preparation and delivery robot comprises a communications system configured to receive a food order and address from a customer, a navigation system configured to automatically drive the vehicle to the address, and an automated food preparation system configured to prepare food in accordance with the food order while en route to the customer address. The automated food preparation system is configured to determine a drive time to travel to the customer address, and determine a preparation time to prepare the food in accordance with the food order. If the drive time is greater than the preparation time, the robot waits and then begins preparing the food after a delay substantially equal to the drive time minus the preparation time. In this manner, preparation of the food coincides with arrival at the customer address.

14 Claims, 3 Drawing Sheets

ROBOT FOR PREPARING AND DELIVERING FOOD ITEMS

CROSS-REFERENCE TO RELATED APPLICATIONS)

This application claims the benefit of U.S. Provisional Patent Application Ser. No. 62/856,649 filed Jun. 3, 2019, titled "Robot for preparing and delivery food items," which is hereby incorporated by reference herein for all purposes.

TECHNICAL FIELD

The invention generally relates to a robot for preparing and delivering food items. In particular, the invention relates to a vehicle an automated robot configured to prepare, cook, and dispense food items to a customer at the customer home or other address.

BACKGROUND

Numerous food delivery services are available to pick up meals from a restaurant and deliver those meals to a customer's home, for example. But this food may become cold or soggy in transit. There is therefore a need for a solution that delivers food that is freshly cooked and dispensed while it is still hot and crispy.

SUMMARY

The invention in the preferred embodiment is an automated food preparation and delivery robot configured to prepare food orders while en route to a customer address, without the aid of a person on the vehicle. The automated food preparation and delivery robot comprises: a vehicle, a communications system configured to receive a food order and address from a customer, a navigation system configured to automatically drive the vehicle to the address; and an automated food preparation system configured to prepare the food in accordance with the food order while en route to the customer address and dispense the food upon arrival. The automated food preparation system is configured to determine a drive time to travel to the customer address, and determine a preparation time to prepare the food in accordance with the food order. If the preparation time is greater than the drive time, the robot immediately begins preparing the food in accordance with the food order. If the drive time is greater than the preparation time, the robot waits and then begins preparing the food after a delay substantially equal to the drive time minus the preparation time. In this manner, preparation of the food is complete at substantially the same time as arrival at the customer address, or within several minutes thereof.

The automated food preparation system generally comprises: an assembly system configured to mix a plurality ingredients to make a pizza(s), for example, an oven configured to cook the assembled ingredients, and a dispenser configured to output the pizza(s) or other cooked food items to the customer at the side of the street. The automated food preparation and delivery robot may further include an inventory processor configured to: determine a quantity of ingredients in the vehicle, and generate one or more notifications when the quantity of ingredients in the vehicle is low.

The entire process including the preparation of the food and delivery of the food is performed without a person in the vehicle.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The preferred embodiment of the present invention is an autonomous robot for preparing and delivering food to order. In the preferred embodiment, the automated food preparation and delivery (AFPD) robot is configured to make and deliver pizzas to order. The AFPD robot could, however, be configured to prepare and deliver any of a countless number of types of food items, as one skilled in the art will appreciate. The AFPD robot includes a self-driving navigation system configured guiding the robot to the location specified by a customer. The AFPD also carries raw food ingredients and a preparation system configured to assemble and cook pizzas while en route to the customer location. In the preferred embodiment, the food preparation and navigation operations are completely automated, thereby obviating the need for any people to cook or drive when in operation.

Figure 1:
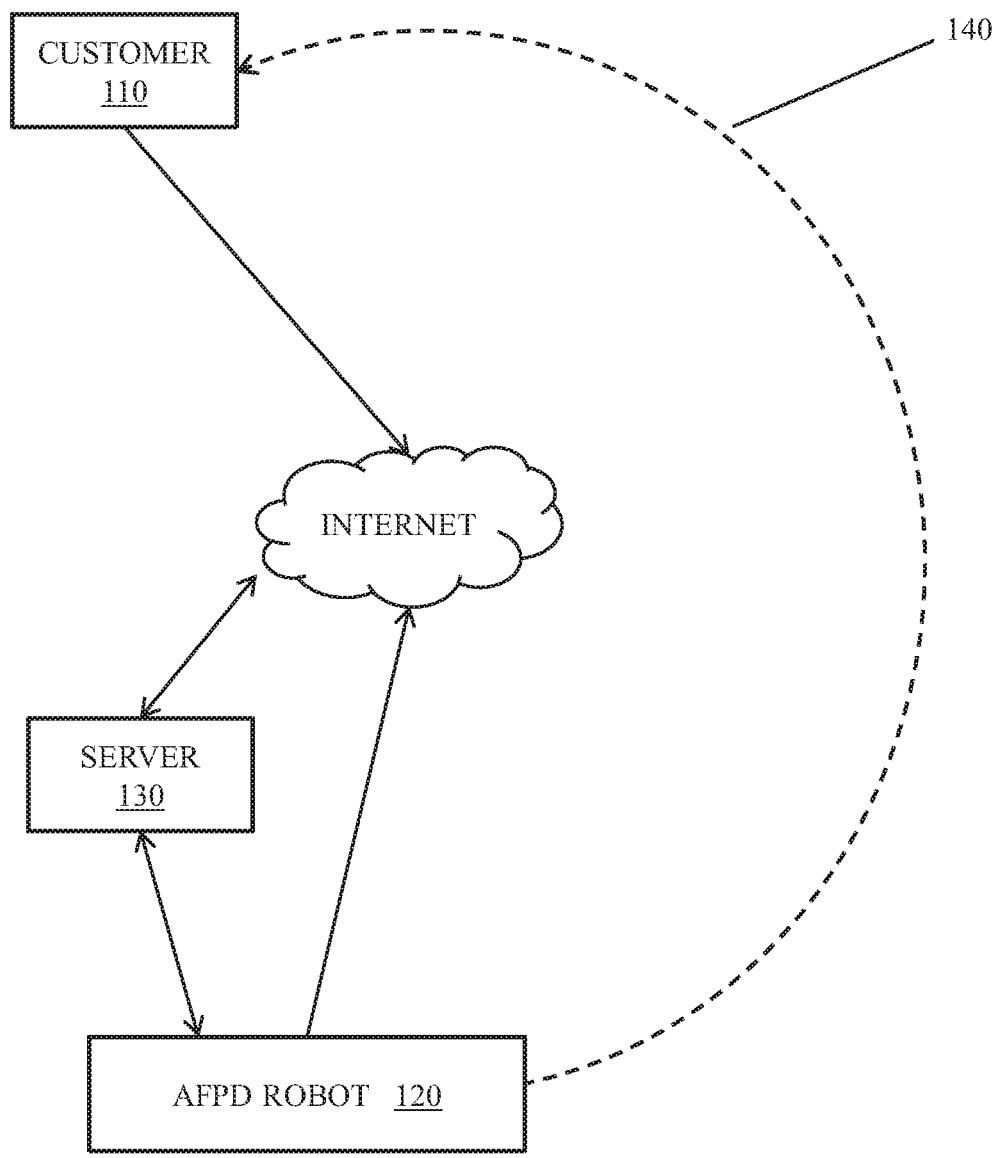
FIG. 1 is a network diagram including a client and automated food preparation and delivery (AFPD) robot, in accordance with a preferred embodiment of the present invention.

Illustrated in FIG. 1 is a network diagram including a customer 110, an automated AFPD robot 120, and optional server 130. The server 130 in some embodiments is configured to communicate with the customer 110 and coordinate one or more operations of the robot 120, as described below. The AFPD robot 120 is configured to prepare pizza for the customer 110 when ordered by the customer or shortly thereafter. The route between the robot 120 and customer 110 is represented by the dashed line 140. The route 140 collectively represents the streets, roads, and/or highways that the robot 120 must travel when preparing and delivering a pizza order to the customer 110.

Figure 2:
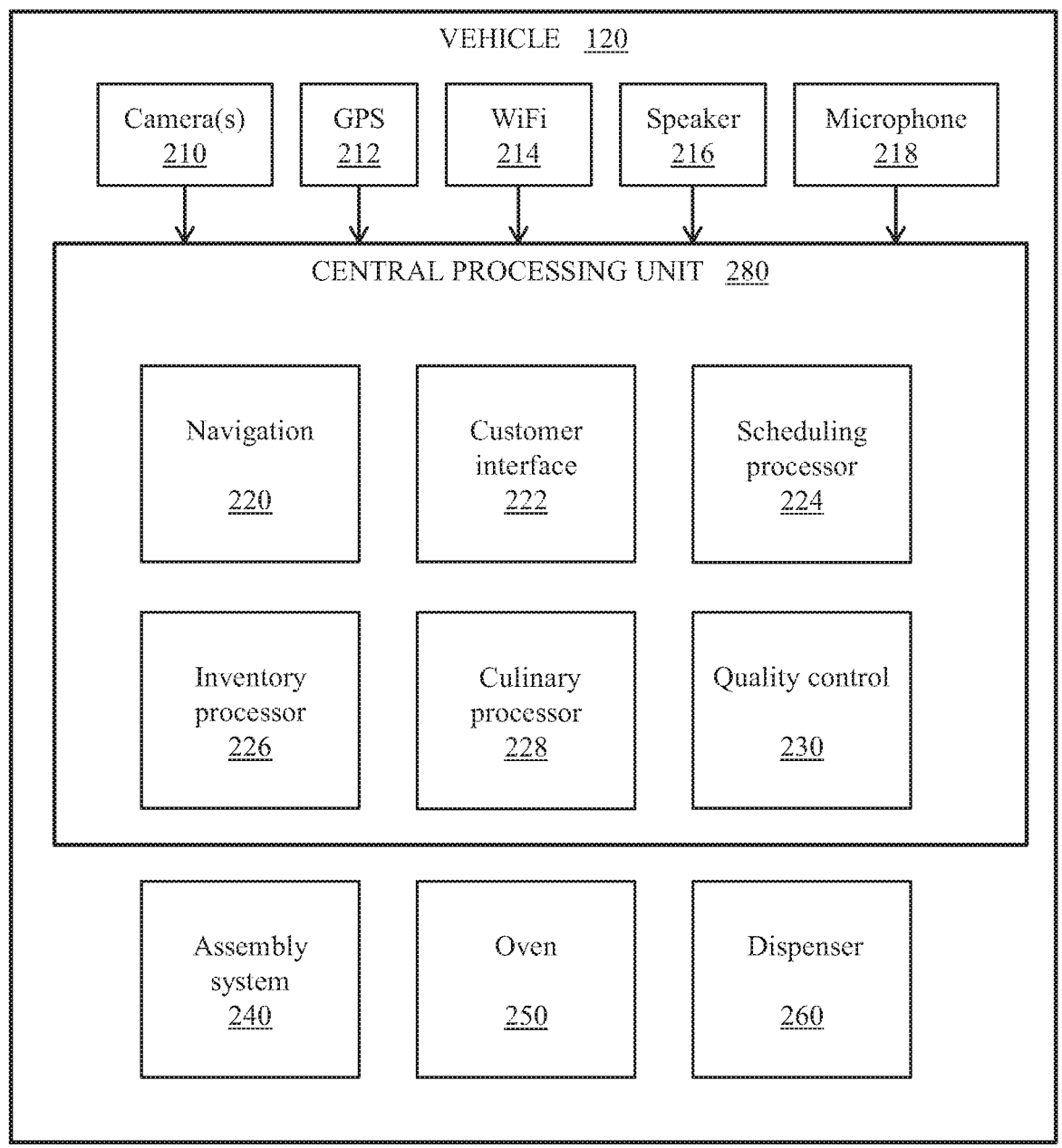
FIG. 2 is a functional block diagram of an AFPD robot, in accordance with a preferred embodiment of the present invention.

Illustrated in FIG. 2 is a functional block diagram of an AFPD robot 120 in the preferred embodiment. The robot 120 in the exemplary embodiment is a truck, van, or other vehicle including a navigation system, communications system, as well as automated food preparation system. The navigation system includes cameras 210 and/or distance-sensing devices configured to visualize the roadways and traffic, a global positioning system (GPS) 212 configured to determine the geographic location of the AFPD robot 120, and a navigation processor 220 configured to plan and execute the route between the AFPD robot's current location and the customer's location.

The communications system includes a Wifi and/or data network antenna 214 configured to exchange food order data with the server 130 or customer 110 directly via the Internet, speaker 216, microphone 218, and customer interface 222. In the preferred embodiment, the speaker 216 and microphone 218 enable direct communication by spoken word with the customer at the delivery location. The customer interface 222 includes a webpage or software application that presents menu options to customers, receives selections from the menu, and exchanges payment information with clients.

With respect to kitchen equipment, the automated food preparation system includes an assembly system 240 configured to assemble and mix various raw ingredients, an oven 250 configured to cook multiple pizzas, and a dispenser 260 configured to box pizzas and output those boxes into the hands of the customers. In some embodiments, the automated food preparation system further includes a quality controller processor 230 configured to perform quality checks on food, the checks including image processing for the purpose of insuring each pizza includes the requested toppings, that the pizza is cooked until the crust is golden brown, and that the pizza is fully in the box before the box is dispensed to the customer.

The automated food preparation system further includes an inventory processor 226, culinary processor 228, and quality control processor 230. The inventory processor 226 is configured confirm that the temperature of raw ingredients onboard the AFPD robot 120 is safe, the quantity of those ingredients, and to notify personnel when the ingredients are running low or need restocking. The culinary processor 228 is configured to specify to the assembly system 226 which ingredients, namely type of sauce and pizza toppings, are to be added to the pizza being assembled. The culinary processor 228 is also configured to specify to the oven 250 the cooking temperature and/or duration of each pizza being prepared.

At least once a day, a person loads raw ingredients into the AFPD robot 120. The food is maintained at a temperature in compliance with health department regulations. After being loaded with ingredients, the AFPD robot 120 waits for a pizza order. While waiting, the AFPD robot may be parked at a home base, parked near potential customers, or driving on a roadway, for example.

The AFPD robot 120 is configured to prepare and cook food while en route to the customer that ordered the food. The timing of the preparation and cooking is critical to the customer experience. If cooking is completed before arrival, for example, the food may arrive cold or soggy, thereby degrading the customer experience. To remedy this issue, the AFPD robot 120 is configured to complete the preparation and cooking of the ordered food at the moment the robot 120 arrives at the location specified by the customer 110.

Figure 3:
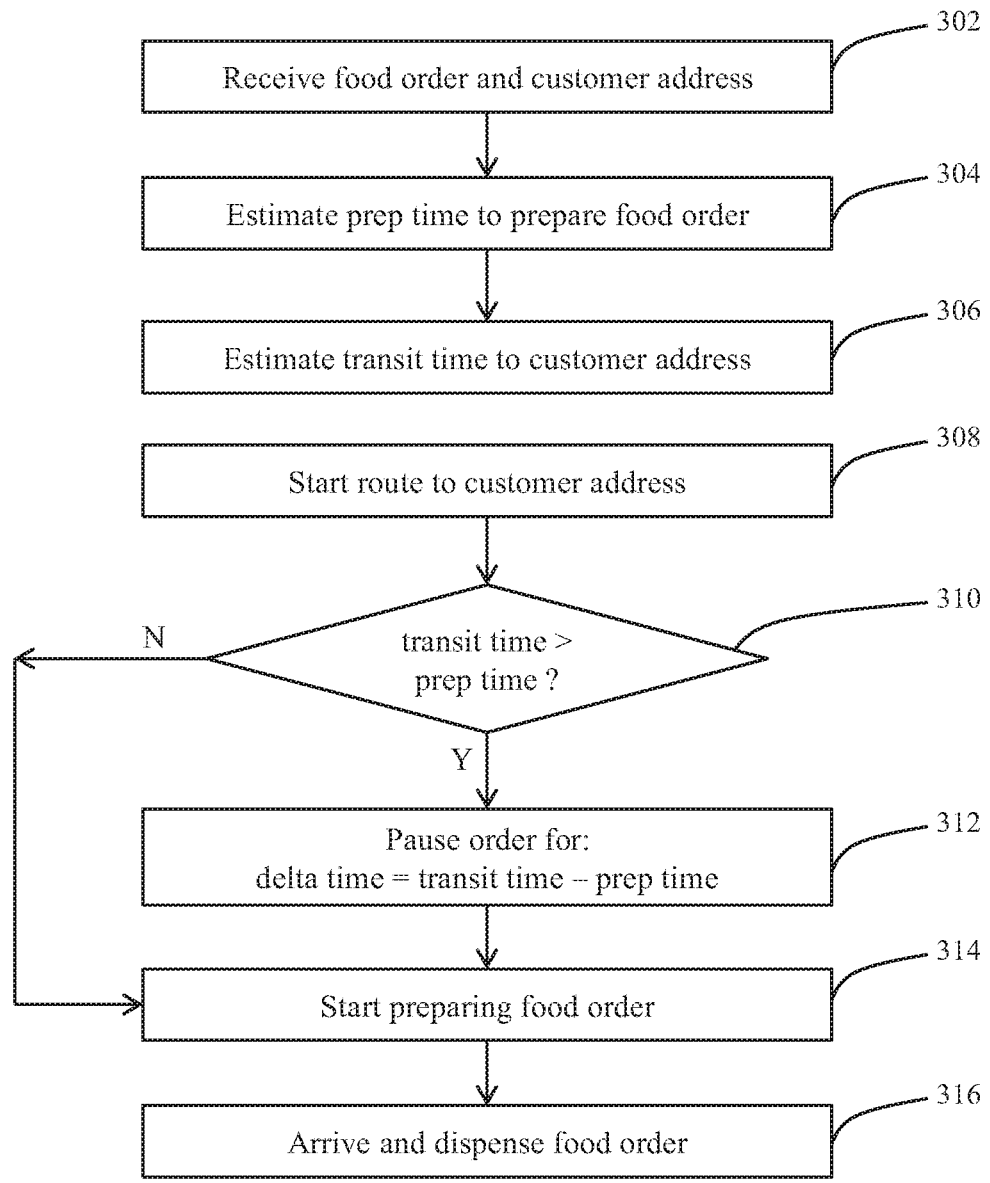
FIG. 3 is a flowchart of a method of scheduling food preparation in the AFPD robot, in accordance with a preferred embodiment of the present invention.

Illustrated in FIG. 3 is a flowchart of a method for scheduling food preparation in the AFPD robot 120. The AFPD robot 120 receives 302 an order for pizzas, for example, as well as the customer address for delivery. The order may be received from the server 130 or the customer 110 directly. The robot 120 processes the order to determine 304 how long it will take to prepare and cook the order. Using the address of the customer provided in the order, the robot 120 computes a route 140 to the customer destination and estimates 306 how long it will take to travel to the customer destination based on the distance and traffic conditions. In parallel, the robot 120 starts 308 to traverse the route 140 in the direction of the customer 110.

If the time necessary to prepare the order exceeds the transit time necessary to get to the customer address, decision block 310 is answered in the negative and the robot 120 begins immediately to prepare 314 the order. To make a pizza, the AFPD robot 120 retrieves pizza dough from a refrigerator, dispenses sauce and requested topping on the pizza dough, and automatically moves the assembled pizza into the oven. In this case, the AFPD robot 120 may arrive at the customer destination before the food is prepared. For the entertainment of the customer, the robot 120 in the preferred embodiment includes a window onto the kitchen to enable people to watch the food being prepared and boxed.

If, however, the transit time exceeds the preparation time to make/cook the order, decision block 310 is answered in the affirmative and the robot 130 waits or pauses 312 before starting the preparation of the order. The pause or delay is equal to the transit time minus the preparation/cooking time. After the pause has expired, the robot 120 begins preparing/cooking 314 the food in the customer's order.

By waiting the appropriate amount of time, the robot 120 minimizes the gap between the arrival time and completion of the order. When properly timed, the AFPD robot 120 completes cooking of the food at the moment of arrival at the customer destination, thereby insuring the food is fresh and as hot as possible.

In the preferred embodiment, the robot sends a message to the customer to confirm that the food order has arrived and is available for pick up on the street. The confirmation includes a passcode. The customer enters the passcode via email or at the truck, which causes the pizzas or other food to be dispensed to the customer 110.

In the preferred embodiment, pizzas are sold to customers based on a subscription model. That is, customers generally enter a contract in which they pay a minimum fee in exchange for a minimum number of pizzas each month, for example. This provides a consistent level of income for the AFPD robot business.

In some embodiments, the home base at which the AFPD robot waits each day is based on the locations of the customers, e.g., the subscription customers. To provide the quickest possible deliver, the AFPD robot waits at a position roughly in the middle of the geographic distribution of customer delivery sites. In an alternative embodiment, the AFPD robot waits each day at the centroid of the subscription customer homes as weighted by the subscription amount. In this manner, the robot waits closer to customers that spend more money on AFPD robot pizzas and further away from customers that spend less money on AFPD robot pizzas.

In some embodiments, the server collects subscriptions for AFPD robot pizzas before there is an AFPD robot to deliver those pizzas. In this manner, customers may express an interest in using the AFPD robot service before the service is actually available in their community. The customers are not actually charged for the subscriptions until the AFPD robot is installed in the community where it can service those customers. If and when enough subscriptions are collected to justify a AFPD robot, the AFPD robot is installed in the neighborhood at a location central to the subscription customers.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, electronic circuit, or module capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including electronic circuits such as personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

I claim:

1. An automated food preparation and delivery robot comprising:
   a vehicle, the vehicle comprising a microphone;
   a communications system configured to receive a food order and address from a customer;
   a navigation system configured to automatically drive the vehicle to the address; and
   an automated food preparation system configured to:
     identify potential customers based at least on customer subscription data corresponding to customers that subscribe to a food service;
     position the vehicle based at least in part on corresponding locations of the potential customers identified based at least on customer subscription data corresponding to customers that subscribe to the food service;
     prepare food in accordance with the food order while en route to the customer address;
     transmit a message to the customer upon arrival of the vehicle at the customer address and dispense the prepared food to the customer at the customer address; and
     enable the customer to utilize the microphone for communication by spoken word at the customer address.

2. The automated food preparation and delivery robot of claim 1, wherein the automated food preparation system is configured to:
   determine a drive time to travel to the customer address; and
   determine a preparation time to prepare the food in accordance with the food order.

3. The automated food preparation and delivery robot of claim 2, wherein the automated food preparation system is configured to:
   if the preparation time is greater than the drive time, begin preparing the food in accordance with the food order.

4. The automated food preparation and delivery robot of claim 3, wherein the automated food preparation system is configured to:
   if the drive time is greater than the preparation time, begin preparing the food after a delay substantially equal to the drive time minus the preparation time.

5. The automated food preparation and delivery robot of claim 4, wherein preparation of the food is complete concurrent with arrival at the customer address.

6. The automated food preparation and delivery robot of claim 1, wherein the automated food preparation system comprises:
   an assembly system configured to mix a plurality of ingredients;
   an oven configured to cook the assembled ingredients; and
   a dispenser configured to output one or more items of cooked food to the customer.

7. The automated food preparation and delivery robot of claim 6, further comprising an inventory processor configured to:
   determine a quantity of ingredients in the vehicle; and
   generate one or more notifications when the quantity of ingredients in the vehicle is low.

8. The automated food preparation and delivery robot of claim 1, wherein the vehicle includes a window, whereby customers can watch food be prepared by the automated food preparation system.

9. The automated food preparation and delivery robot of claim 1, wherein the vehicle is configured to prepare food and drive to the customer address without a person in the vehicle.

10. An automated food preparation and delivery robot on a drivable vehicle, the robot comprising:
    a microphone;
    a communications system configured to receive a food order and address from a customer;
    a navigation system configured to automatically drive the vehicle to the address; and
    an automated food preparation system configured to prepare food in accordance with the food order while en route to the customer address;
    the robot configured to:
      position the vehicle based at least in part on corresponding locations of potential customers identified based at least on customer subscription data corresponding to customers that subscribe to a food service;
      transmit a message to the customer upon arrival of the vehicle at the customer address, and
      enable the customer to utilize the microphone for communication by spoken word at the customer address.

11. The automated food preparation and delivery robot of claim 10, wherein the automated food preparation system is configured to:
    determine a drive time to travel to the customer address; and
    determine a preparation time to prepare the food in accordance with the food order.

12. The automated food preparation and delivery robot of claim 11, wherein the automated food preparation system is configured to:
    if the preparation time is greater than the drive time, begin preparing the food in accordance with the food order.

13. The automated food preparation and delivery robot of claim 12, wherein the automated food preparation system is configured to:
   if the drive time is greater than the preparation time, begin preparing the food after a delay substantially equal to the drive time minus the preparation time.

14. The automated food preparation and delivery robot of claim 13, wherein preparation of the food is complete concurrent with arrival at the customer address.

* * * * *